United States Patent [19]

Fazis

[11] 4,200,019
[45] Apr. 29, 1980

[54] TABLE STOP FOR A CUTTING MACHINE
[75] Inventor: Harald Fazis, Lörrach-Hauingen, Fed. Rep. of Germany
[73] Assignee: Ludwig Boschert GmbH & Co. KG, Fed. Rep. of Germany
[21] Appl. No.: 907,104
[22] Filed: May 18, 1978
[30] Foreign Application Priority Data
  May 24, 1977 [DE] Fed. Rep. of Germany ....... 2723432
[51] Int. Cl.² .............................................. B26D 7/16
[52] U.S. Cl. ................................... 83/467 R; 83/589; 83/467 A
[58] Field of Search ...................... 83/467, 467 A, 589

[56] References Cited
U.S. PATENT DOCUMENTS

| 649,112 | 5/1900 | Smith | 83/589 |
|---|---|---|---|
| 2,524,344 | 10/1950 | English | 83/467 |
| 2,656,888 | 10/1953 | Cruzan | 83/467 |
| 3,125,140 | 3/1964 | Nichols | 83/467 A |

*Primary Examiner*—Donald R. Schran
*Attorney, Agent, or Firm*—Frailey & Ratner

[57] ABSTRACT

A table stop for a machine for cutting sheet material, more particularly a notching machine, comprising a double acting pressure cylinder for each the adjustment of the stroke of a stop rail along the blade of the cutting tool and its angular adjustment about a vertical pivot axis. The two pressure cylinders being coupled for a trailing movement of the one pressure cylinder provided for the angular adjustment by the other pressure cylinder being provided for the adjustment of the stroke. The relatively movable working members of the two pressure cylinders being connected with the stop rail through pivots.

11 Claims, 1 Drawing Figure

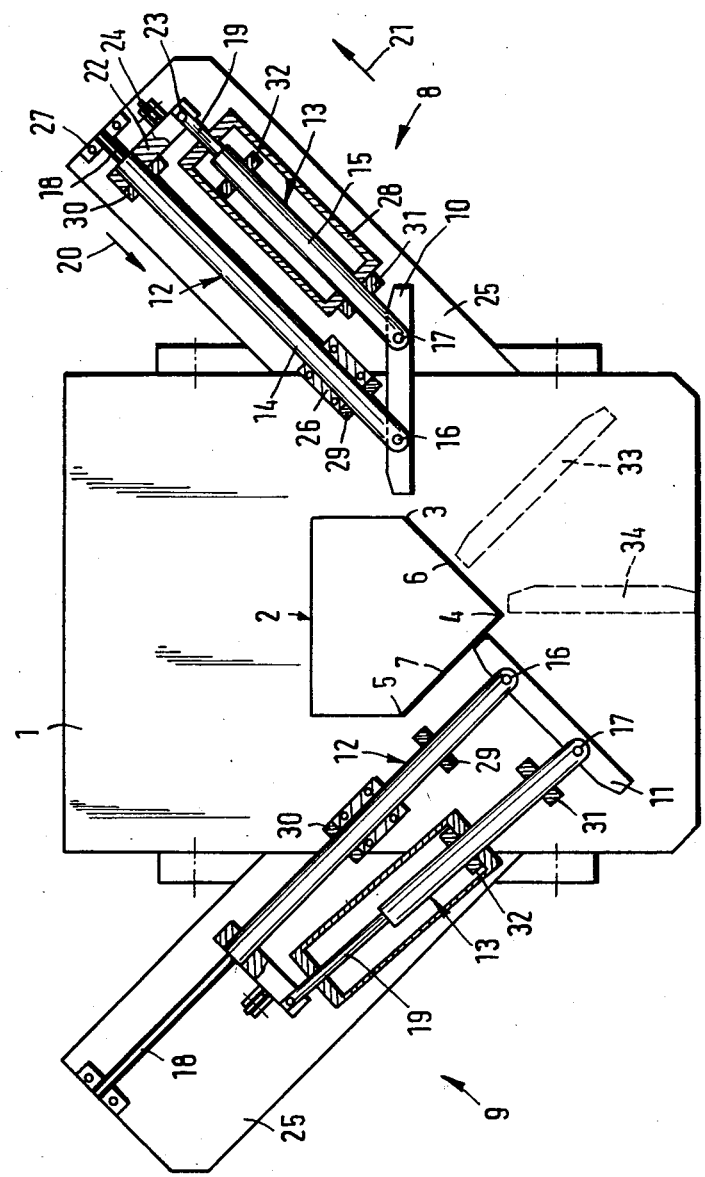

TABLE STOP FOR A CUTTING MACHINE

This invention relates to a table stop for cutting sheet material, more particularly a notching machine, comprising a stop rail which is operated by a pressure force for being movable along the blade of a cutting tool whereby the stroke of this movement of the stop rail is limited by means of two adjustable gauges, the stop rail being further arranged for being rotatable about a pivot axis extending vertically with respect to the machine table whereby this angular adjustment of the stop rail is limited by means of two further adjustable gauges.

Table stops of this kind serve the purpose of determining for two differently designed cutting operations on a sheet material the respectively desired positive stop position of the stop rail so that with any suitable control of the admittance of the pressure force it will be possible to provide a simple change between the two different positions of the stop rail relative to the blade of the cutting tool as soon as a respective change between such two different cutting operations will be desired. In case of a notching machine there are therefor provided for this purpose a total of two of such table stops the stop rails of which are each mounted in an adjustable manner in respect to the stroke and in respect to their angular adjustment each about a pivot axis extending vertically with respect to the machine table along the two blades as disposed at an right angle with respect to each other of an upper blade assembly which is movable by means of a ram relatively to a lower blade assembly mounted on the machine table. With respect to the stroke of these stop rails a stroke of up to 600 mm must be taken into consideration depending upon the length of the blades whereas for the angular adjustment it will become necessary to adjust the stop rails within a limit of about 90° for achieving a cutting angle in respect to the coordinated blade between for example 45° and 135°.

It is an object of the present invention to provide a table stop of this kind which is more accurate in the adjustment of the differently possible relative positions of the stop rail.

In accordance with the invention a table stop is therefore provided wherein a respective double acting pressure cylinder is provided for each the adjustment of the stoke and the angular adjustment, the respective gauges being arranged adjustably on the relatively movable working member of the respective pressure cylinder.

The adjustment of the stroke of the stop rail is thereby functionally separated from the angular adjustment so that it is made possible to achieve optimal requirements for anyone of these two fields of adjustment in respect to a specified adjustment of the stop rail. This will also include the possibility of coupling the two pressure cylinders in a specified manner so that for example in case of the pressure cylinder which is provided for the angular adjustment of the stop rail a relatively short design length can be achieved by coupling its starting position to the relative position of the relatively movable working member of the pressure cylinder which is provided for the adjustment of the stroke of the stop rail.

Further advantageous and expedient features of the present invention are referred to in the respective claims.

The invention will now be described by way of an example as schematically shown in the accompanying drawing which shows a plan view partially in cross-section of the two table stops in accordance with the invention as provided for a notching machine.

The drawing shows a plan view on the machine table 1 of a notching machine having an upper blade assembly (not shown) mounted on a ram and cooperating with a lower blade assembly which is mounted on the machine table whereby each blade assembly comprises two pairwise cooperating blades. The ram is provided with a cross-section substantially corresponding to the line 2 whereby the portions 6 and 7 extending between the corner points 3, 4 and 5 correspond with the extension and the length of the cooperating blades of the upper and lower blade assemblies which determine the cutting edges of notches that may therewith be produced with different dimensions. On the machine table 1 two equally designed table stops 8 and 9 are arranged each comprising a stop rail 10 and 11, respectively. The stop rails 10 and 11 are each adjustable by means of two double acting pressure cylinders 12 and 13 which are driven either by pressure oil or pressure air whereby anyone of the pressure cylinders is arranged for the adjustment of the stroke of the respective stop rail whereas anyone of the pressure cylinders 13 is arranged for its angular adjustment. Each pressure cylinder 12, 13 comprises a working cylinder 14 and 15, respectively, forming the relatively movable working members of these pressure cylinders and being connected at their one end through a respective pivot 16 and 17 with the coordinated stop rail 10 and 11, respectively. Each pressure cylinder 12, 13 comprises further a piston arranged in the respective working cylinder 14, 15 whereby this piston is fixed to a respective piston rod 18 and 19 being arranged as a relatively stationary working member of the respective pressure cylinder. The piston rods 18, 19 are for example provided with a central bore (not shown) which communicates with a pressure chamber that is provided for causing a displacement of the working cylinders 14, 15 in the direction of the arrow 20 whereas another path for the pressure medium leading to a further pressure chamber of each pressure cylinder 12 and 13 provides for that under the pressurized condition of the same the working cylinders will then be displaced in the opposite direction of the arrow 21.

The working cylinders 14 of the pressure cylinders 12 are connected through a ridid interconnecting member 22 with the piston rod 19 of the pressure cylinders 13 which on their part are connected with the interconnecting member 22 through a further pivot 23. The rigid interconnecting members 22 are each supported through a respective roller bearing 24 on a supporting member 25 which is flanged to the machine table at a sideward position. The entire arrangement of the two pressure cylinders 12 and 13 of the respective table stops 8 and 9 are supported in each case by the respective supporting member 25 whereby the arrangement further comprises, respectively, an axial guide means 26 for the working cylinder 14, a supporting bearing 27 for the piston rod 18 and a supporting frame 28 which axially guides the working cylinder 15 and also supports its piston rod 19 in addition to the roller bearing 24. On each of the two working cylinders 14 and 15 there are finally mounted two gauges 29 and 30, and 31 and 32, respectively, by means of which the adjustment of the stroke which is caused by the pressure cylinder 12 and the angular adjustment which is caused by the pressure cylinder 13 may be adjusted to the desired limit values for the adjustment of the stop rails 10 and 11, respectively.

When in the retracted starting position as shown for the table stop 8 the pressure cylinder 12 which is provided for the adjustment of the stroke is actuated by the supply of pressure medium then the working cylinder 14 of the same will be displaced forwardly. When the working cylinder 14 is thusly displaced the gauge 29 will be moved away from the axial guide means 26 whereas the gauge 30 will be trailed to a stopping position at this axial guide means 26. As soon as this stopping position is reached the adjustment of the stroke as caused by the pressure cylinder 12 will be finished so that then the angular adjustment of the stop rail 10 may be begun with.

This angular adjustment begins at the relative position of the pressure cylinder 12 as shown for the table stop 9 since with the adjustment of the stroke the pressure cylinder 13 has been trailed by the pressure cylinder 12 or rather its respective working cylinder 14 into this this particular starting position. For the pressure cylinder 13 only a minimum stroke is therefore needed for the actual angular adjustment whereby the pressure cylinder is rotated about the pivot 23 which rotation is continued until the gauge 32 contacts the supporting frame 28. The stop rail 10 will then reach for example a relative position as shown by the dotted lines 33 which is an intermediate position with respect to the end position shown by the dotted lines 34. In this intermediate position 33 the stop rail 10 will be held together with the stop rail 11 which has been brought into a corresponding position for allowing the cutting of notches having dimensions corresponding to this relative position of the two stop rails 10 and 11 as long as the stop rails 10 and 11 are newly adjusted to the relative position as defined by the gauges 29 and 31 for then allowing the cutting of notches of correspondingly different dimensions.

The servo drive for the two pressure cylinders may be designed either hydraulically or pneumatically or even mechanically. In case of a mechanic design the relative stationary member of each pressure cylinder, i.e. especially the piston rod, would for example be replaced by a driven spindle on which a live screw as fixed to the coordinated movable member, i.e. the working cylinder of the respective pressure cylinder, would be running. When such a mechanic servo drive is provided for the pressure cylinders there would in addition exist the possibility for a numeric control of the relevant driving variable, i.e. for example an electromotor, whereby in this case the gauges as provided for the adjustment of the stroke and the angular adjustment would be replaced by any suitable manipulated variables of this control. Instead of a driving spindle and a live screw there could be also used a respective rack being in mesh with a drive pinion.

I claim:

1. A table stop for a machine for cutting sheet material, more particularly a notching machine comprising, a stop rail which is movable along the blade of a cutting tool whereby this movement of the stop rail is limited by means of two adjustable gauges, the stop rail further being rotatable about a pivot axis extending vertically with respect to the machine table whereby the angular adjustment of the stop rail is limited by means of two further adjustable gauges, a respective double acting pressure cylinder for each of (1) adjustment of the movement of the stop rail and (2) the angular adjustment of the stop rail, the respective gauges being arranged adjustably on the relatively movable working member of the respective pressure cylinder.

2. A table stop according to claim 1 wherein the relatively movable working member of the pressure cylinder which is provided for the adjustment of the movement of the stop rail is connected with the relatively stationary working member of the pressure cylinder which is provided for the angular adjustment of the stop rail for a trailing movement of the same between the end positions as determined by the two coordinated gauges.

3. A table stop according to claim 1 wherein the relatively movable working members of the two pressure cylinders are each connected through a respective pivot with the stop rail and the relatively stationary working member of the pressure cylinder which is provided for the angular adjustment of the stop rail is connected through a further pivot with the relatively movable working member of the pressure cylinder which is provided for the adjustment of the stroke of the stop rail.

4. A table stop according to claim 3 wherein the two pivots are arranged at the two ends of the stop rail.

5. A table stop according to claim 3 wherein said further pivot is arranged on a rigid interconnecting member with the relatively movable working member of the pressure cylinder which is provided for the adjustment of the stroke of the stop rail.

6. A table stop according to claim 5 wherein at least the rigid interconnecting member is supported on the machine table by means of a roller bearing or the like.

7. A table stop according to claim 1 wherein at least the relatively movable working member of the pressure cylinder which is provided for the adjustment of the stroke of the stop rail is axially guided by means of a supporting bearing which is supported on the machine table.

8. A table stop according to claim 7 wherein the supporting bearing is designed as a stop means for the two coordinated gauges which are provided for the adjustment of the stroke.

9. A table stop according to claim 1 wherein the two pressure cylinders are arranged on a supporting member which is flanged to the machine table.

10. A table stop according to claim 1 wherein the relatively movable working members are formed by the working cylinders of the pressure cylinders.

11. A table stop according to claim 1 wherein there is provided means for driving the pressure cylinder either hydraulically or pneumatically or mechanically.

* * * * *